United States Patent
Hearn

(10) Patent No.: US 8,461,740 B2
(45) Date of Patent: Jun. 11, 2013

(54) ROTARY ELECTRIC MACHINE

(75) Inventor: Stephen Mark Hearn, Cheshunt (GB)

(73) Assignee: Goodrich Control Systems, Solihull (GB)

( * ) Notice: Subject to any disclaimer, the term of this patent is extended or adjusted under 35 U.S.C. 154(b) by 269 days.

(21) Appl. No.: 13/088,878

(22) Filed: Apr. 18, 2011

(65) Prior Publication Data

US 2012/0091851 A1    Apr. 19, 2012

(30) Foreign Application Priority Data

Apr. 22, 2010 (GB) .................................. 1006742.9

(51) Int. Cl.
*H02K 3/34* (2006.01)

(52) U.S. Cl.
USPC .......................................... 310/215; 310/214

(58) Field of Classification Search
USPC .................. 310/213–215, 254.1, 52
See application file for complete search history.

(56) References Cited

U.S. PATENT DOCUMENTS

| | | | | |
|---|---|---|---|---|
| 2,778,964 A * | 1/1957 | Balke | ............................. | 310/214 |
| 2,985,780 A * | 5/1961 | Bigelow et al. | ............... | 310/215 |
| 2,998,540 A * | 8/1961 | Phillips | ......................... | 310/214 |
| 4,247,978 A * | 2/1981 | Smith | ............................. | 29/596 |
| 4,602,180 A * | 7/1986 | Olson | ............................ | 310/215 |
| 5,554,898 A | 9/1996 | Howard et al. | | |
| 5,821,652 A * | 10/1998 | Hyypio | .......................... | 310/83 |
| 6,107,709 A | 8/2000 | Cooper | | |
| 7,480,977 B2 * | 1/2009 | Smigelski | ........................ | 29/598 |
| 7,687,964 B2 * | 3/2010 | Du et al. | ........................ | 310/215 |
| 2005/0099085 A1* | 5/2005 | Du et al. | ........................ | 310/215 |
| 2011/0012473 A1* | 1/2011 | Parmeter et al. | ............... | 310/214 |

* cited by examiner

*Primary Examiner* — Thanh Lam
(74) *Attorney, Agent, or Firm* — Andrus, Sceales, Starke & Sawall, LLP

(57) ABSTRACT

A rotary electric machine comprises a rotor rotatable within a stator assembly, the stator assembly comprising a stator body defining a plurality of stator slots accommodating electrical conductors, a slot liner being provided within each slot to provide electrical insulation between the stator body and the electrical conductors, wherein each slot liner protrudes from an end of the stator slot and carries an armor element to protect the slot liner and associated conductors from erosion while permitting efficient cooling.

13 Claims, 2 Drawing Sheets

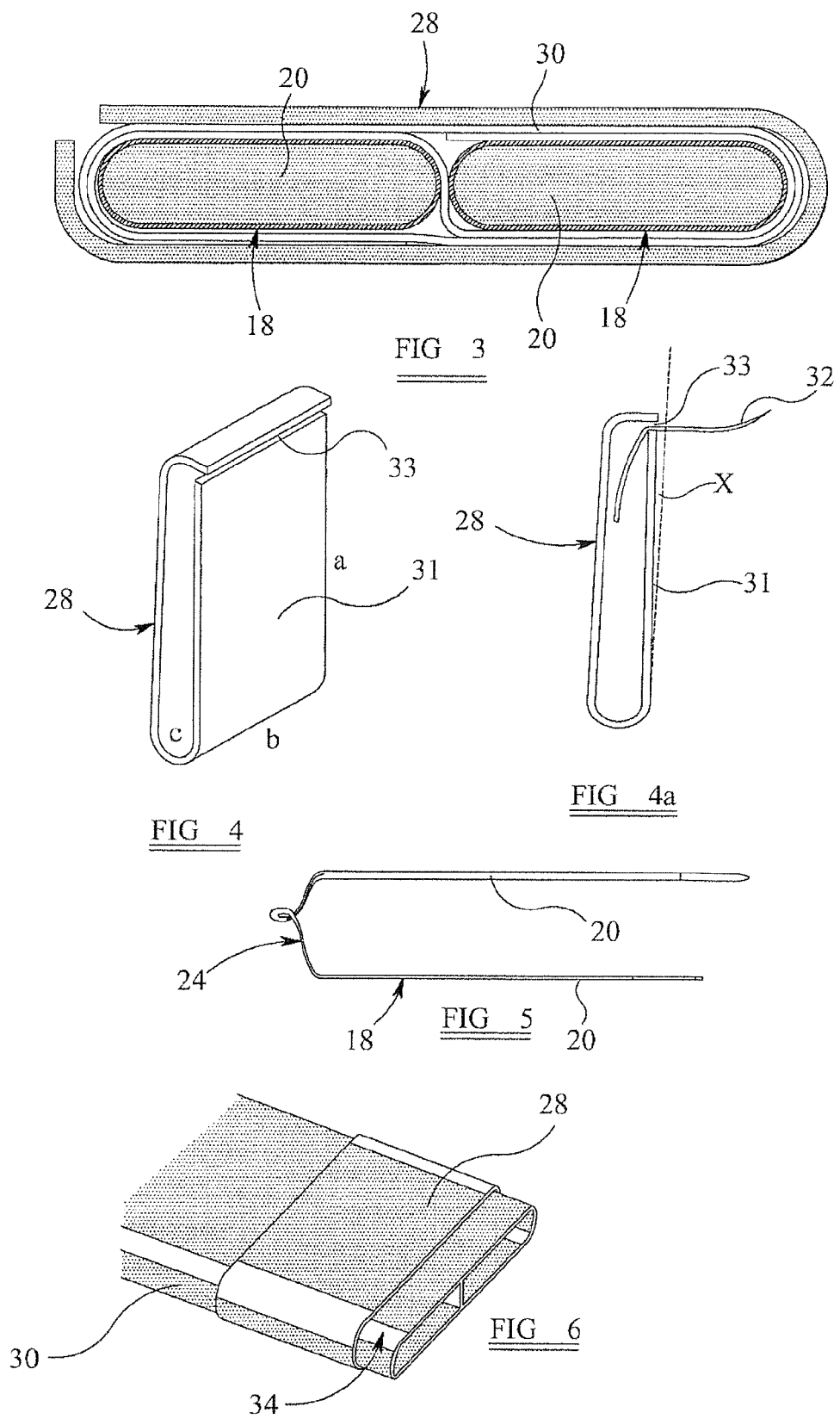

ROTARY ELECTRIC MACHINE

This invention relates to a rotary electric machine, for example to an electrical generator suitable for use in aerospace applications.

A typical electrical generator suitable for use in such applications, for example the variable frequency generators used on large modern civil aircraft, comprises a rotor supported for rotation within a wound stator. The coil end windings of the stator extend beyond or protrude or overhang the main body of the rotor. As significant levels of heat are generated in use, it is usual to provide a cooling arrangement to cool the generator, and one form of cooling arrangement in common use is to provide the rotor or a shaft associated therewith with an internal flow passage which is supplied with cooling oil, generally radially extending passages being provided in the rotor or shaft to allow cooling oil to flow from the internal flow passage towards the stator. The cooling oil flows onto and over the protruding ends parts of the windings, carrying heat away from the stator as the cooling oil flows away to a suitable reservoir.

The jets of cooling oil emanating from the radially extending passages are at high velocities, and so the impact pressure with which they engage with surrounding components is significant. Where the radially extending passages are axially aligned with the overhanging windings, it has been found that the impact pressure of the jets of cooling oil on the windings can cause damage thereto. For example, significant levels of erosion of the insulation of the conductors have been experienced.

U.S. Pat. No. 5,554,898 and U.S. Pat. No. 6,107,709 both describe arrangements in which the cooling oil jets are vectored in such a manner as to reduce the risk of erosion. Although of some assistance, it has been found that unacceptable levels of erosion may still occur in such arrangements.

Another approach that has been considered for reducing the level of erosion is to replace the aforementioned radially extending passages with slots to reduce the impact pressure. Although such techniques may significantly reduce the level of erosion experienced, the improvements achieved are still insufficient to meet current requirements whilst maintaining cooling at an acceptable level.

It is an object of the invention to provide a rotary electric machine in which at least some of the disadvantages with such known arrangements are reduced or overcome.

According to the present invention there is provided a rotary electric machine comprising a rotor rotatable within a stator assembly, the stator assembly comprising a stator body defining a plurality of stator slots accommodating electrical conductors, a slot liner being provided within each slot to provide electrical insulation between the stator body and the electrical conductors, wherein each slot liner protrudes from an end of the stator slot and carries an armour element to protect the slot liner and associated conductors from erosion whilst permitting efficient cooling.

The armour elements are conveniently axially aligned with cooling fluid outlet openings provided in the rotor.

The conductors conveniently comprise hairpin conductors, each having a pair of conductor legs integrally formed and electrically connected to one another, each stator slot preferably being arranged to receive one of the conductor legs of one of the hairpin conductors and one of the conductor legs of another of the hairpin conductors. Each slot liner is preferably arranged to electrically insulate the conductor legs located within each stator slot from one another and from the stator body.

Each armour element preferably comprises a clip shaped to extend around the protruding end of the associated slot liner. Each clip is preferably of a material of good erosion resistance, and is preferably also of good corrosion and oxidation resistance. For example, each clip may be formed of Inconel X-750 alloy which is non-magnetic, hardenable, resistant to corrosion and oxidation and is resistant to relaxation. After shaping to form the clip, the material is preferably spring tempered to be of high surface hardness and also to retain its shape. However, it will be appreciated that the invention is not restricted to the use of this specific material and that a number of other suitable materials may be used.

The invention will further be described, by way of example, with reference to the accompanying drawings, in which:

FIG. 3 is a diagrammatic sectional view illustrating part of the machine;

FIGS. 4 and 4a are perspective and end views of an armour element of the machine;

FIG. 5 is a view illustrating a hairpin conductor of the machine; and

FIG. 6 is diagrammatic view illustrating an alternative embodiment.

Figure 1:
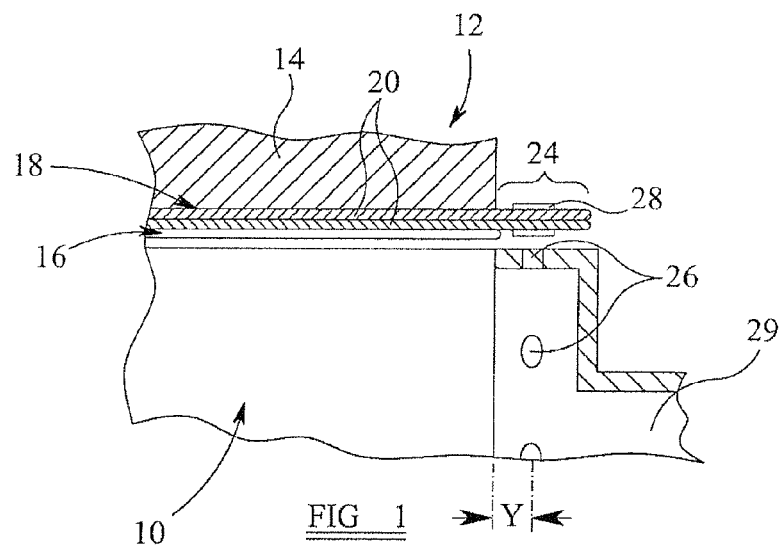
FIG. 1 is a simplified diagrammatic view illustrating part of one end of a rotary electric machine in accordance with one embodiment of the invention.

Referring firstly to FIG. 1 there is illustrated a rotary electric machine in the form of an electrical generator intended for use in aerospace applications. The machine comprises a rotor 10 supported for rotation within and relative to a stator assembly 12. The stator assembly 12 comprises a stator body 14 provided with a series of stator slots 16 configured to accommodate electrical conductors 18 which together form a stator coil arrangement.

The electrical conductors 18 are of hairpin-like form, each comprising a pair of legs 20 (as best shown in FIG. 5) integrally formed with one another, and hence interconnected with one another, at one end. The conductors 18 are provided with an enamel coating layer apart from at the free ends of the legs 20 where the enamel is omitted to facilitate brazing of the conductors 18. The conductors 18 are arranged such that each stator slot 16 accommodates a leg 20 of two different conductors 18, each conductor 18 thus having one leg 20 extending within one of the stator slots 16 and another leg 20 extending within another of the stator slots 16. The free ends of the legs 20 are connected with one another in a known fashion (ie by brazing) to result in the conductors 18 together defining the stator coil arrangement.

Figure 2:
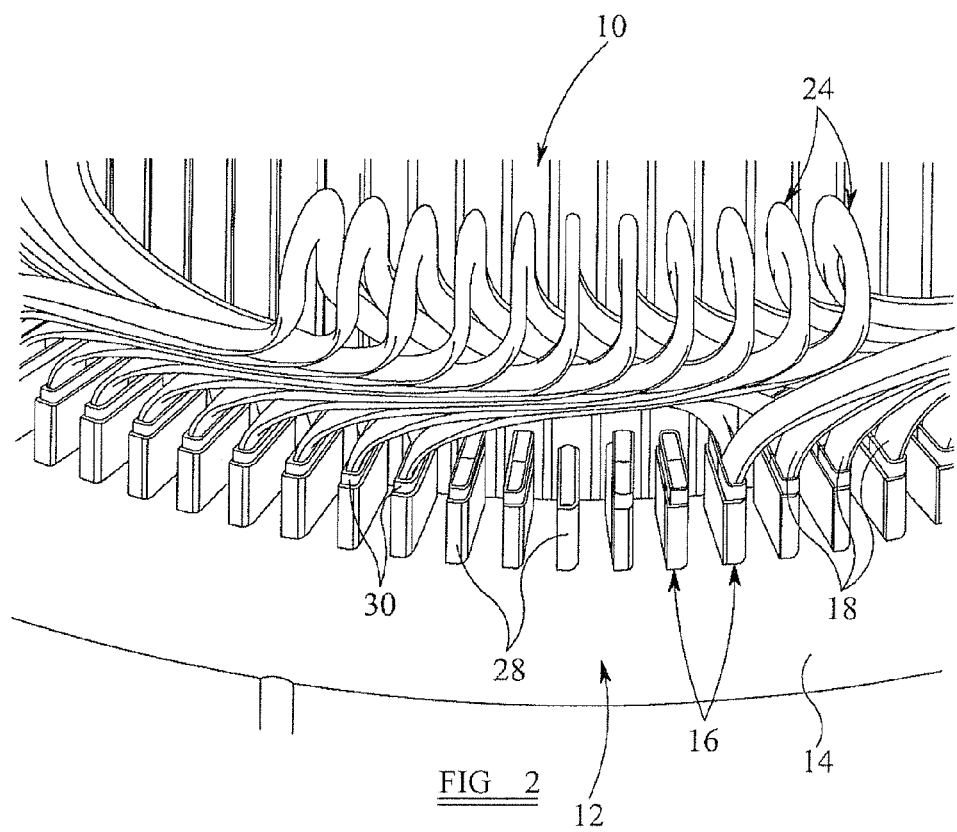
FIG. 2 is a perspective view illustrating part of one end of the machine of FIG. 1.

As is apparent from FIGS. 1 and 2, each conductor 18 includes a protruding part 24 which protrudes from one end of the stator slot 16 with which it is associated, the protruding part 24 forming the interconnection between the associated legs 20. The free ends of the legs 20 protrude from the other end of the stator slot 16 (not illustrated). The protruding part 24, and the free ends of the legs 20, are axially aligned with respective series of cooling oil or other fluid outlets 26 provided in the rotor 10 which communicate with an interior cooling oil or fluid passage 29 provided within the rotor 10. The fluid outlets 26 are located in the rotor at an axial distance Y (see FIG. 4) from the stator body 14 at both ends of the assembly.

In use, as the rotor 10 is rotated at high speed about its axis, cooling oil or fluid supplied to the passage 29 escapes therefrom at high velocity through the outlets 26, the cooling oil or fluid flowing substantially radially outwards and impinging upon the components surround the rotor 10. As the protruding parts 24 of the conductors 18, and the free ends of the legs 20 at the other end of the stator, are located radially outward of the outlets 26, a significant proportion of the cooling oil or fluid impinges thereon before flowing away, thus carrying heat energy away from the conductors 18 and so serving to cool the conductors 18 and surrounding components.

As mentioned hereinbefore, there is a risk that the high velocity jets of cooling oil or other fluid can cause erosion of, for example, the insulation associated with the conductors and so, in accordance with the invention, the protruding parts 24 of the conductors 18, and the free ends of the legs 20 at the other end of the stator, are provided with armour elements 28 that are axially aligned with the outlets 26, preventing direct contact between the conductors 18 and the high velocity cooling oil or other fluid jets and thereby reducing the risk of erosion damage.

The armour elements 28 take the form of clips of a suitable erosion resistant material, for example Inconel X-750 alloy. For example they may be formed from a sheet or foil of 0.25 mm thickness to substantially the shape shown in FIG. 4. After being shaped to take this form, a tempering operation is preferably conducted to provide the clips with a high surface hardness and so that the shape of the clip is retained with some resilient capability. The high surface hardness renders the clips of good erosion resistance, the material being hardenable as a result of the incorporation of titanium and aluminium therein. The material is non-magnetic and is of good corrosion and oxidation resistance and of good resistance to relaxation.

The armour elements 28 are not secured directly about the conductors 18 as to do so would short the conductors to one another. Rather they are mounted upon slot liners 30 provided in the stator slots 16. The slot liners 30 serve to provide electrical insulation between the conductors 18, and between the conductors 18 and the stator body 14. In accordance with the invention the slot liners 30 are of greater axial length than would normally be the case, protruding from the ends of the stator slots 16 and serving to support the armour elements 28. As shown in FIG. 2, the length of the slot liners 30 is such as to protrude beyond the ends of the armour elements 28, thus ensuring that the conductors 18 are electrically insulated from the armour elements 28. The armour elements 28 are designed to clip onto the protruding parts of the slot liners 30 to provide good retention thereof, but without causing damage to the slot liners 30 or conductors 18. The increase in the axial lengths of the slot liners 30 to accommodate the armour elements 28 also requires the legs 20 of the conductors 18 to be of increased axial length than would otherwise be required.

Although the slot liners 30 could take a range of forms, the illustrated slot liners 30 comprise single side coated polymide films which are wrapped as a double layer, in a figure of eight configuration, around the legs 20 of the conductors 18 as shown in FIG. 3.

It is envisaged that the design of each armour element is as illustrated in FIGS. 4 and 4a and will be of approximately the following dimensions:

a=10.5 mm b=6.5 mm c=01.4 mm

The side 31 of each armour element is formed at a slightly inwardly facing angle X as illustrated in FIG. 4a such that, in conjunction with the dimension C, when the armour elements are fitted over the conductors 18 and slot liner 30 their resilient capability ensures good retention thereof. It is envisaged that angle X will be of the order of 1°, although it will be appreciated that the invention is not restricted in this regard.

A typical electrical generator will require the installation of 192 armour elements 28, 96 armour elements 28 being located at each end of the stator body 14. As the armour elements 28 are of axial dimension (b) approximately 6.5 mm, and are fitted at both ends of the stator body 14, the slot liners 30 are each extended in axial length from approximately 140 mm in a typical arrangement to approximately 151 mm. The distance by which the slot liners 30 protrude from the armour elements 28 is approximately 1.5 mm.

However, it will be appreciated that the invention is not restricted in this regard and a range of other dimensions could be used without departing from the scope of the invention. Further, a different number of armour elements 28 may be required depending upon the design of the stator assembly.

To ensure that during fitting of each armour element 28 over the associated conductors 18 and slot liner 30 the armour element 28 does not damage the slot liner 30, a temporary piece of liner material 32 may be inserted through a gap 33 in the armour element 28 prior to fitting. The temporary liner 32 is then removed following fitting. This procedure is repeated for fitting of each individual armour element.

After assembly, the stator assembly 12 is impregnated with a suitable varnish material to ensure that the various components parts are securely bonded to one another in a conventional manner.

In the preferred embodiment of the invention illustrated in FIGS. 1 and 2, the design of the armour elements is such that they can be fitted against the stator body whilst still being axially aligned with the fluid outlets 26. Alternatively, the armour elements 28 could be of reduced axial length, for example being reduced from 6.5 mm to 5.0 mm, such that when fitted so as to be axially aligned with the outlets 26 there is a gap between the end of the stator body 14 and the armour elements 28. In this embodiment, illustrated in FIG. 6, the end of the slot liner 30 is provided with a tag 34 that can be folded over to provide an indicator to ensure that the armour element 28 is correctly positioned thereon. This spacing of the armour elements from the stator body may also be necessary if the design of the rotor assembly is such that distance Y is increased and the preference is not to increase the length of the armour elements.

In the arrangements described hereinbefore the provision of the armour elements 28 supported by the protruding ends of the slot liners 30 and extending around the protruding parts 24 of the conductors 18 serves to protect the slot liners 30 and protruding parts 24 of the conductors 18 from the high velocity jets of cooling oil or other fluid that would otherwise impinge thereon, in use. As a result, the risk of erosion damage thereto is significantly reduced. However, efficient cooling of the conductors 18 and adjacent components is maintained as the cooling oil or other fluid is still able to pass close to and around the conductors 18.

A wide range of modifications and alterations to the arrangements described hereinbefore may be made without departing from the scope of the invention. For example, alternative materials may be used, and the armour elements 28 may be of a different shape and/or size if desired. Further, although a specific design of rotary electric machine is described, the invention may be applied to a number of other machines.

The invention claimed is:

1. A rotary electric machine comprising a rotor rotatable within a stator assembly, the stator assembly comprising a stator body defining a plurality of stator slots accommodating electrical conductors, a slot liner being provided within each slot to provide electrical insulation between the stator body and the electrical conductors, wherein each slot liner protrudes from an end of the stator slot and carries an armour element to protect the slot liner and associated conductors from erosion whilst permitting efficient cooling.

2. A machine according to claim 1, wherein the armour elements are axially aligned with cooling fluid outlet openings provided in the rotor.

3. A machine according to claim 1, wherein the conductors comprise hairpin conductors, each having a pair of conductor legs integrally formed and electrically connected to one another.

4. A machine according to claim 1, wherein each stator slot is arranged to receive at least two conductors.

5. A machine according to claim 4, where each slot liner is arranged to electrically insulate the conductors located within each stator slot from one another and from the stator body.

6. A machine according to claim 1, wherein each armour element comprises a clip shaped to extend around the protruding end of the associated slot liner.

7. A machine according to claim 6, where each clip is of a material of good erosion resistance.

8. A machine according to claim 6, wherein each clip is of a material of good corrosion and oxidation resistance.

9. A machine according to claim 6, wherein each clip is of a non-magnetic material.

10. A machine according to claim 6, wherein each clip of formed of Inconel X-750 alloy.

11. A machine according to claim 6, wherein each clip is spring tempered to be of high surface hardness and also to retain its shape.

12. A machine according to claim 1, wherein each armour element is spaced apart from the adjacent end of the stator body.

13. A machine according to claim 1, wherein each slot liner protrudes from opposing ends of the stator body, and armour elements are provided to protect both protruding ends of the slot liner.

* * * * *